United States Patent [19]

Sheppard

[11] Patent Number: 4,601,458

[45] Date of Patent: Jul. 22, 1986

[54] MAGNETIC AIR VALVE

[75] Inventor: William L. Sheppard, Romulus, Mich.

[73] Assignee: AVM Corporation, Jamestown, N.Y.

[21] Appl. No.: 480,074

[22] Filed: Mar. 29, 1983

Related U.S. Application Data

[63] Continuation-in-part of Ser. No. 311,192, Oct. 14, 1981, abandoned.

[51] Int. Cl.[4] .............................................. F16K 31/06

[52] U.S. Cl. ............................... 251/129.19; 335/279; 335/249; 251/129.01

[58] Field of Search ................ 251/141; 335/249, 271, 335/277, 279

[56] References Cited

U.S. PATENT DOCUMENTS

| | | |
|---|---|---|
| 1,034,370 | 7/1912 | McCarty . |
| 2,294,421 | 9/1942 | Ray . |
| 2,374,895 | 5/1945 | Ray . |
| 2,612,907 | 10/1952 | Harris . |
| 2,750,962 | 6/1956 | Kreitchman et al. . |
| 2,828,936 | 4/1958 | Hales . |
| 2,914,034 | 11/1959 | Becker . |
| 3,422,850 | 1/1969 | Caldwell . |
| 3,479,627 | 11/1969 | Underwood . |
| 3,549,119 | 12/1970 | Sellers . |
| 3,726,315 | 4/1973 | Sheppard . |
| 4,005,733 | 2/1977 | Riddel ............................ 251/141 X |
| 4,317,559 | 3/1982 | Finkbeiner et al. ................ 251/331 |

FOREIGN PATENT DOCUMENTS

| | | |
|---|---|---|
| 1158174 | 11/1963 | Fed. Rep. of Germany . |
| 2506205 | 8/1975 | Fed. Rep. of Germany . |
| 1183324 | 7/1959 | France . |
| 1408864 | 7/1965 | France . |
| 1414840 | 9/1965 | France . |
| 439138 | 11/1935 | United Kingdom . |
| 750869 | 6/1956 | United Kingdom . |
| 905866 | 9/1962 | United Kingdom . |
| 1189004 | 4/1970 | United Kingdom . |
| 1414371 | 11/1975 | United Kingdom . |
| 2002594A | 2/1979 | United Kingdom . |
| 1559836 | 1/1980 | United Kingdom . |
| 2104730A | 3/1983 | United Kingdom . |

*Primary Examiner*—Arnold Rosenthal
*Attorney, Agent, or Firm*—Allegretti, Newitt, Witcoff & McAndrews, Ltd.

[57] ABSTRACT

A magnetically operated valve having a resilient flat-surfaced valve member cooperating with a valve seat is disclosed. The resilient member is preferably mounted on an armature in a manner to permit relative motion therebetween to allow the armature to gain a predetermined inertia prior to engaging the resilient member so as to aid in overcoming the pressure differential across the resilient member. Additionally, the electromagnet thereof acts unevenly on the armature so as to cause tilting movement thereof and a corresponding "prying" movement of the resilient member from the valve seat. The valve may be operated in the normally-opened or the normally-closed mode. In one embodiment, at least a portion of the armature is provided with a non-magnetic covering or coating, thereby forming a non-magnetic gap thereon. In another embodiment, a non-magnetic wear plate is disposed between at least a portion of the electromagnet and the armature. Such wear plate substantially prevents the armature from contacting and wearing said portion of said magnetic actuating means during the tilting movement of the armature.

8 Claims, 6 Drawing Figures

FIG. 1.
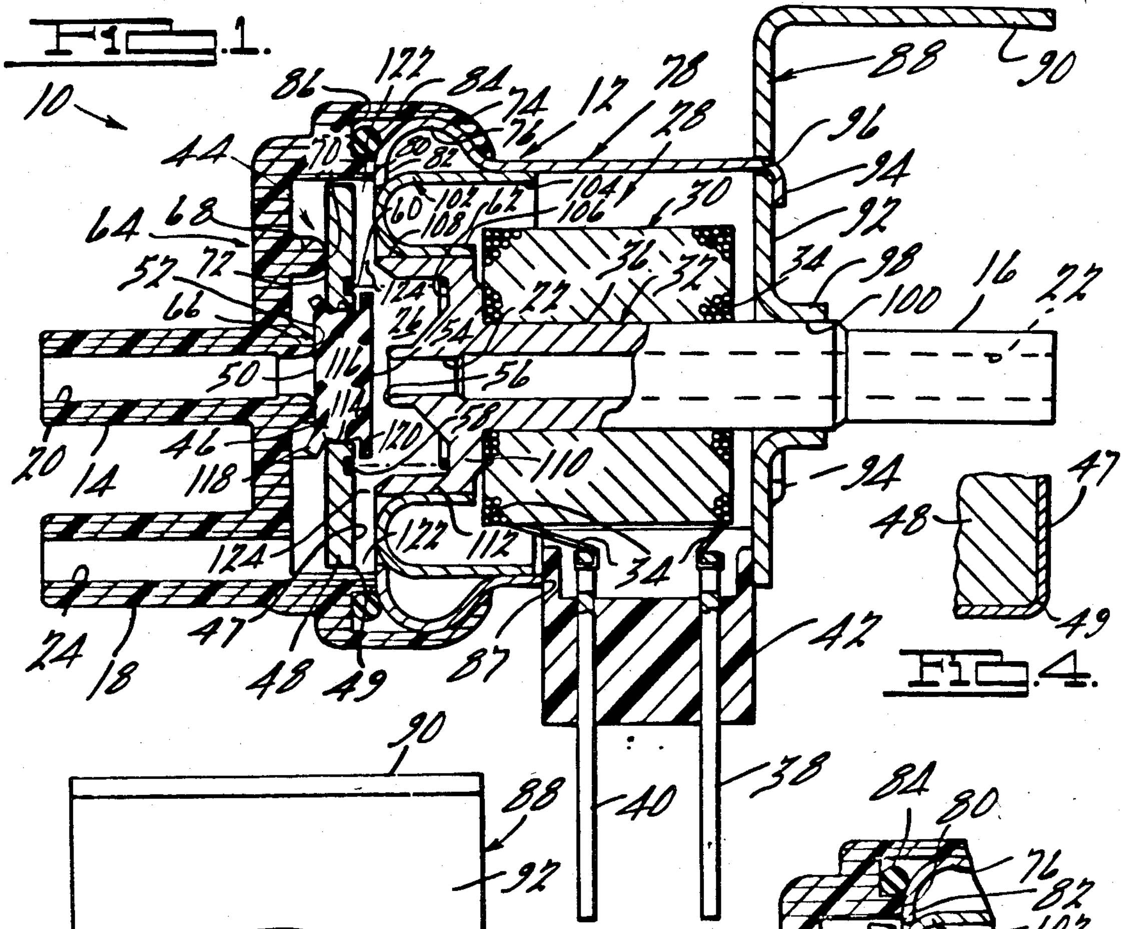
FIG. 4.
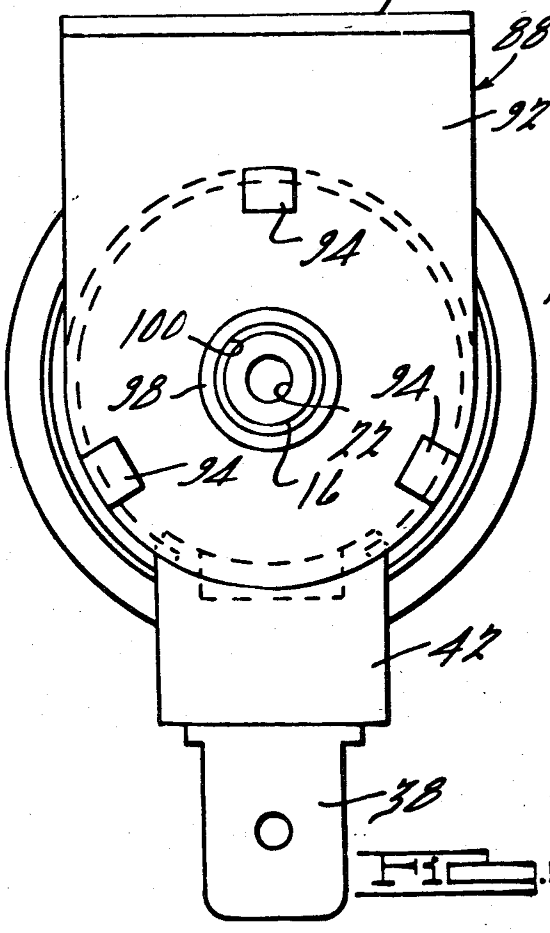
FIG. 2.
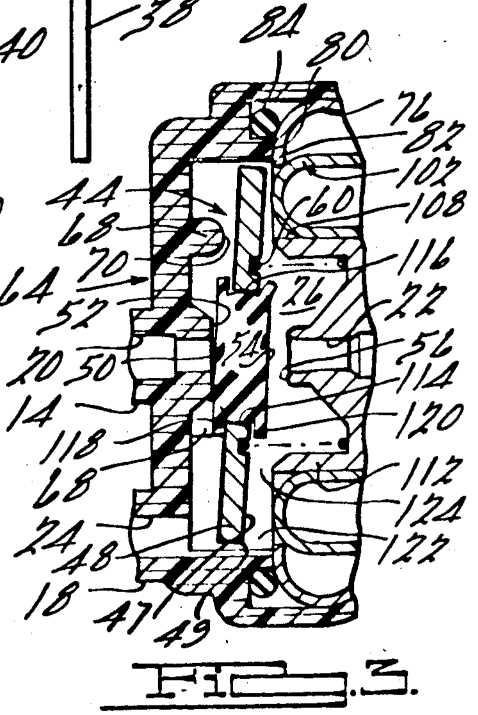
FIG. 3.

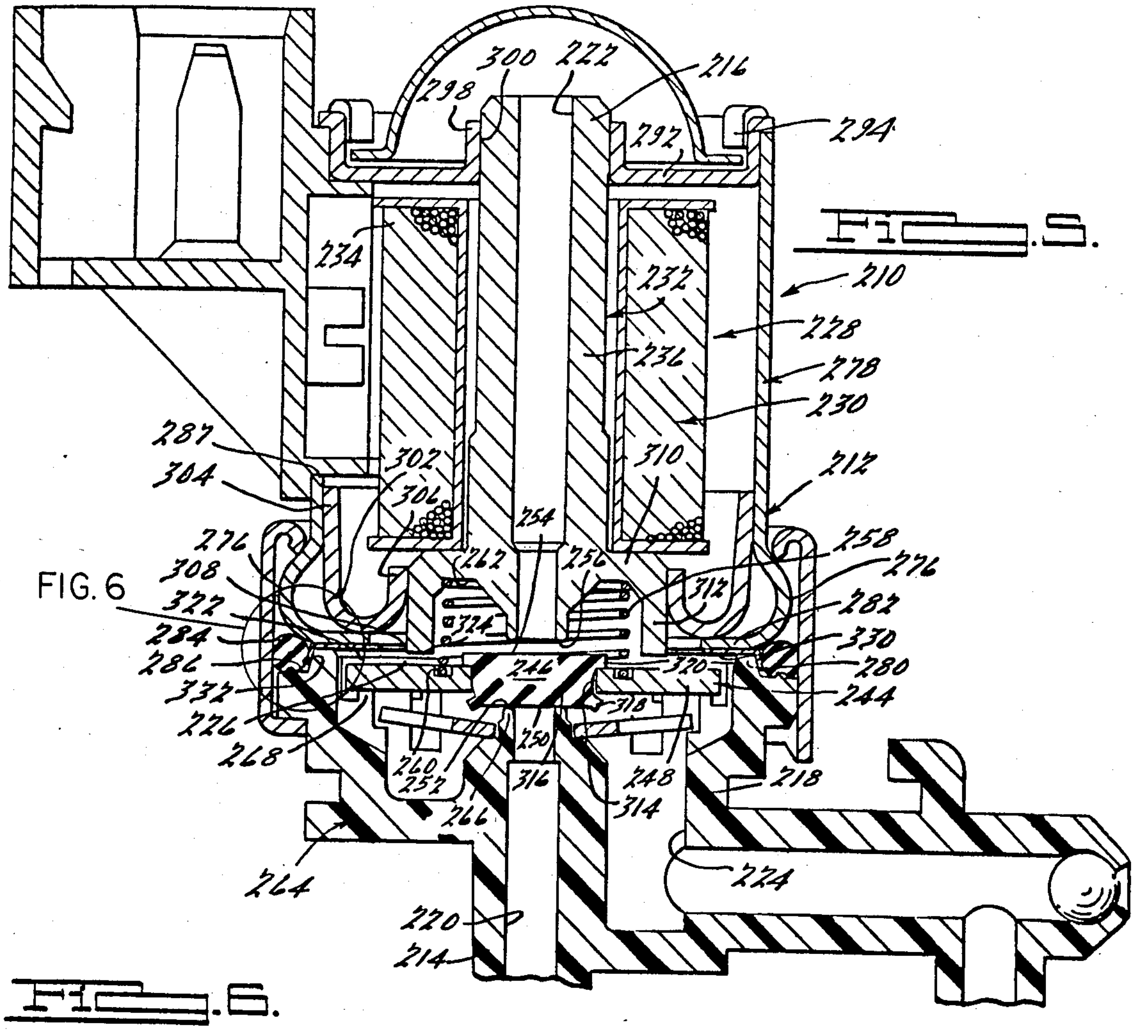
FIG. 5.
FIG. 6.
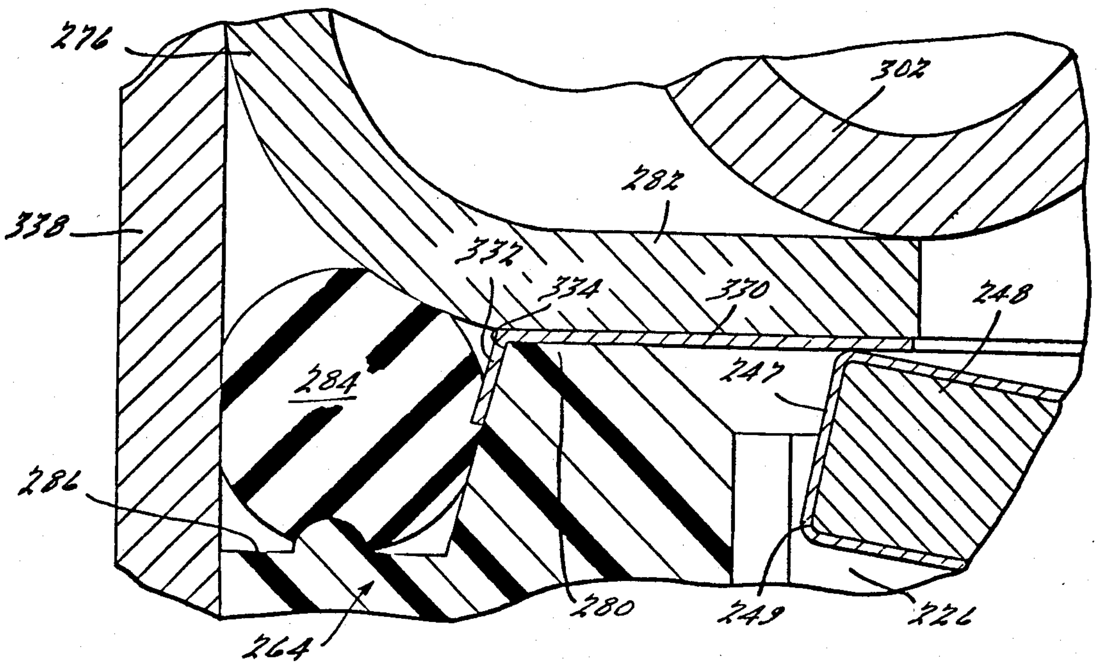

MAGNETIC AIR VALVE

This is a continuation-in-part of application Ser. No. 311,192, filed Oct. 14, 1981, now abandoned. This continuation is thus related to co-pending application Ser. No. 605,983, filed May 1, 1984, which is a divisional application of the aforementioned application Ser. No. 311,192, filed Oct. 14, 1981, now abandoned.

BACKGROUND OF THE INVENTION

This invention relates generally to gas (particularly, air) valves, and more specifically, to magnetically-operated gas valves.

Ideally, a magnetically-operated valve should be compact, reliable, fast operating and capable of inexpensive manufacture. Prior art magnetic valves commonly use a movable needle having a resilient conical end cooperating with a conical valve seat such that insertion of the needle into the valve seat causes fluid-tight engagement of the conical surfaces thereof. It will be appreciated that needle-type valves require precise alignment between the needle and the opening therefor which contributes to relatively high manufacturing costs, and furthermore, adversely affects the reliability and longevity of the valves in use.

Any misalignment occurring by virtue of inherent manufacturing tolerances must be compensated for by using relatively strong springs to forcibly urge the needle into a fully seated condition, and additionally, misalignment may cause binding between the needle and valve seat, each of these conditions thereby placing commensurate demands upon the electromagnet if it is to unseat the needle in opposition to the relatively heavy springs and binding effects. Additionally, since a portion of the conical needle end extends into the opening, even after unseating of the needle, a relatively high lift or separation of the needle from the opening is required to permit restriction-free flow therethrough. This requirement for a high needle lift or excursion imposes an additional demand upon the electromagnet.

From a cost standpoint, it is highly desirable to minimize the demand made on the electromagnet so as to minimize the number of ampere-turns required. More particularly, the conductors utilized are generally of a highly conductive material, such as copper or aluminum, which are quite expensive. Therefore, it is desirable, from a cost standpoint, to limit the use thereof. It can be seen then that the high lift requirement and the binding propensity of needle-type valves contribute significantly to the costs of a magnetic valve by requiring a relatively high number of ampere-turns.

The disclosure of U.S. Pat. No. 3,726,315, issued to the inventor named herein, is hereby incorporated by reference herein. Said patent discloses an improved magnetic valve which is simple in construction, reliable, and most importantly, required fewer ampere-turns in its electromagnet than previous magnetic valves. More specifically, an exemplary magnetic valve according to said disclosure is provided with a movable valve element having a portion of magnetic material and including a flat surface portion cooperating with a valve seat. The implementation of a flat surfaced movable valve element allows unrestricted flow through the valve with smaller amounts of valve member lift or excursion than that required with competitive prior art devices. For example, the movable valve element may comprise a resilient member having a substantially flat surface portion for engaging the valve seat, and an armature member constructed of magnetic material on which the resilient member is mounted. The resilient member is mounted on the armature member in a manner to provide a predetermined relative movement therebetween so that the armature member may develop an initial velocity upon actuation of the valve prior to its acting upon the resilient member so that its inertia will overcome the seating force established by the pressure differential across the valve.

A synergistic effect is achieved in a valve according to said disclosure since the electromagnet will act unevenly on the armature member due to purposeful or inherent tolerance variations in the valve causing an uneven lifting of the armature which pries or peels the resilient member from the valve seat. Due to the combined result of the low excursion requirement, the inertia effect of the armature member, and the "prying" or "peeling" effect, a significantly lower magnetic flux density is required, and accordingly, the number of ampere-turns within the electromagnet are fewer than those of the competitive prior art devices of like purpose. As a consequence, a significant cost savings is achieved. As a still additional advantage, the alignment between the movable valve element and the valve seat is not critical, and accordingly assembly is economically and easily accomplished, tolerances are not critical, and dimensional variations due to wear have a minimal effect on the reliability and longevity of the device.

In accordance with one embodiment of the present invention, the armature member of such a magnetic air valve is provided with a non-magnetic covering or coating, preferably of a predetermined thickness. The non-magnetic covering serves as a non-magnetic gap, or an "artificial air gap", between the armature member and the electromagnet to control the magnetic flux force therebetween when the electromagnet is energized. The covering or coating or such embodiment preferably includes an inner layer of relatively inexpensive, easy-to-apply non-magnetic material and an outer layer of a relatively hard, wear resistant non-magnetic material. The inner layer is preferably composed of copper or a copper-containing substance, and the outer layer is preferably composed of electroless nickel.

The non-magnetic armature covering in the above-described embodiment is preferably formed by a method involving covering or plating the armature member with the first layer of non-magnetic material and tumbling the armature member to polish the same. Similarly, the armature member is then covered or plated with the outer layer of non-magnetic material and may also be tumbled in order to polish the same, if deemed necessary. Such final polishing is performed before the outer layer is heated for hardening.

In accordance with another embodiment of the invention, a non-magnetic wear plate is disposed between at least a portion of the electromagnet and the armature member to control the magnetic flux force therebetween when the electro-magnet is energized. The wear plate also substantially prevents the armature member from directly contacting, and thus wearing, such portion of the electromagnet when the electromagnet is energized. In this embodiment, the armature is preferably provided with only the above-mentioned outer layer of the relatively hard, wear resistant non-magnetic material.

Additional advantages and features of the present invention will become apparent from the following description of the appended claims, taken in conjunction with the accompanying drawings.

BRIEF DESCRIPTION OF THE DRAWINGS

FIG. 1 is a side cross-sectional view of an exemplary embodiment of a magnetic valve according to this invention.

FIG. 2 is an end view of the magnetic valve of FIG. 1.

FIG. 3 is a partial side cross-sectional view of the magnetic valve of FIG. 1 illustrating the operation thereof.

FIG. 4 is an enlarged view of a corner portion of the armature member of the magnetic valve of FIG. 1.

FIG. 5 is a side cross-sectional view of another exemplary embodiment of a magnetic valve according to this invention.

FIG. 6 is an enlarged view of the circled portion of FIG. 5, but illustrating the armature member in its tilted, or pivoted, position.

DETAILED DESCRIPTION OF THE PREFERRED EMBODIMENT

FIGS. 1 through 6 of the drawings illustrate exemplary embodiments of a magnetic valve according to the invention. One skilled in the art will readily recognize from the following discussion that the invention is equally applicable to valves other than those shown in the drawings as well as to other magnetically-actuated devices.

In FIGS. 1 through 4, one exemplary embodiment of a magnetic valve 10 according to the present invention is illustrated. Referring now particularly to FIG. 1, the magnetic valve 10 has a housing assembly indicated generally as 12 and three tube fittings or nipples 14, 16, and 18, each having a cylindrical flow opening 20, 22 and 24, respectively. the opening 24 communicates with a central chamber 26 within the housing 12 at all times whereas the openings 20 and 22 communicate with the central chamber 26 at selected times to be described more particularly below. The magnetic valve 10 further has an electromagnet inside the housing 12 indicated generally at 28 which comprises a coil 30 and a core 32. The coil 30 has a number of turns or convolutions of a conductor 34 (fewer ampere-turns than those of competitive prior art magnetic valves of like utility) about a stem portion 36 of the core 32. The conductor 34 is connected at one end thereof to a first terminal 38 which extends outside of the housing 12, and at the other end to a second terminal 40, also extending outside of the housing 12. The terminals 38 and 40 are mounted in an insulating block 42, which constitutes one part of the housing 12 and is adapted to position the terminals 38 and 40 for convenient electrical connection.

The magnetic valve 10 further includes a movable valve element or assembly, indicated generally at 44, consisting of a resilient member 46, of rubber or other elastomeric material or the like, and an armature member 48 constructed of a magnetic material, i.e., a material having low reluctance to magnetic flux such as iron, steel, electronic silicon steel, or other suitable ferromagnetic material. The resilient member 46 has a first substantially flat surface portion 50 which is adapted to sealingly engage a first valve seat 52 at the interior end of the opening 20 when the movable valve assembly 44 is in the extreme leftward position as shown in FIGS. 1 and 3. The resilient member 46 has a second substantially flat surface portion 54 which is adapted to sealingly engage a second valve seat 56 when the movable valve assembly 44 is in the extreme rightward position. As can be seen in FIG. 1, the cylindrical opening 22 extends axially from the fitting 16 through the stem portion 36 to the valve seat 56. The movable valve assembly 44 is resiliently biased to the left by a light, coiled-spring member 58 which preferably engages an annular groove 60 in the armature member 48 at its one end and abuts the surface 62 of the core 32 at its other end so as to be prestressed in compression.

It can now be seen that a fluid path is provided from the opening 20 to the opening 24 by way of the valve seat 52. Moreover, the flow of fluid through the valve seat 52 may be restrictively influenced or terminated by seating the substantially flat surface portion 50 of the resilient member 46 on the valve seat 52. Accordingly, seating of the flat surface portion 50 on the valve seat 52 restricts or terminates fluid flow through the magnetic valve 10 from opening 24 to opening 20. Similarly, a fluid path is provided from the opening 22, by way of the valve seat 56, to the opening 24. Moreover, the fluid flow by the valve seat 56 is restrictively influenced or terminated by seating the substantially flat surface portion 54 on the valve seat 56 to restrict or terminate flow through the valve 10 from opening 22 to opening 20.

The housing assembly 12 has an end cap assembly 64 which preferably is integrally molded of nylon or other plastic material. As can be seen in FIG. 1, the end cap assembly 64 includes tube fittings 14 and 18, as well as the first valve seat 52. The valve seat 52 is preferably centrally disposed and is formed by an elevated radiused annular projection 66 as shown. The end cap 64 has three rounded armature supports or projections 68 (one not shown) which are circumferentially equally-spaced and which project a predetermined distance with respect to the valve seat 52 as will be described in greater detail hereinafter.

The end cap 64 additionally includes a rounded inwardly-extending lip portion 74 which engages an outwardly curved left end portion 76 of a cylindrical body 78 so as to secure the end cap 64 to the body 78. A projection 80 on the end cap 64 engages an inwardly extending flange 82 on the curved left end portion 76 of the cylindrical body 78 so as to provide an axial engaging force between the curved lip 74 and the curved end portion 76 of the cylindrical body 78 thereby establishing a fluid seal therebetween. An additional fluid seal between the end cap 64 and the cylindrical body 78 is provided by an O-ring 84 residing in a groove 86 therefor in the end cap 64. The O-ring 84 forcibly engages the end cap 64 and the curved end portion 76 of the cylindrical body 78 by virtue of its distension while in place as shown. The preferred method of assembling the end cap 64 to the cylindrical body 78 includes the steps of inserting the O-ring 84 in the groove 86 and placing the end cap 64 on the cylindrical body 78. The lip 74 is initially axially extending rather than curved as shown. The lip 74 is curved over the end portion 76 of the cylindrical body 78 by applying heat and radially inward force thereto, for example, by a spinning operation utilizing a formed spinning tool which heats the material through friction.

The cylindrical body 78 is formed of a magnetic material, i.e., material having a low reluctance, so as to serve as a conductor portion of a magnetic circuit to be described hereinafter. The cylindrical body 78 has a rectangular opening 87 in the side wall thereof which accepts the insulating member 42 previously described.

The housing assembly 12 also includes an end mounting bracket, indicated generally as 88, which includes a mounting flange 90 extending at a right angle with respect to an end plate portion 92. The cylindrical body 78 is fixedly secured to the end mounting bracket 88 by means of three tabs 94 extending through slots 96 in the end plate portion 92 which are inwardly bent or folded as shown in FIGS. 1 and 2. The end plate portion 92 has an annular outwardly extending flange 98 providing a bore 100 which receives and closely cooperates with the stem portion 36 of the core 32. The end mounting bracket 88 is also constructed of a magnetic material so as to constitute an additional portion of a magnetic circuit to be described later.

The housing assembly 12 further includes an annular U-channel sealing member 102 which is constructed of a high reluctance material such as brass or the like. The U-channel member 102 has a radially outward portion 104, which engages and is preferably brazed or soldered to the inwardly extending flange 82 and the internal bore of the cylindrical body 78, and a radially inward portion 106, which engages and is preferably brazed or soldered to a cylindrical portion 108 of the core 32. The U-channel member 102 is resiliently prestressed in bending, thereby providing an effective fluid seal between the cylindrical body 78 and the core 32 for the chamber 26.

The left end of the core 32 is provided with a radially extending web 110 and an axially extending flange 112 which is positioned in an adjacent, spaced relation with respect to the armature 48. The core 32 is also constructed of a magnetic material so as to constitute yet another portion of the magnetic circuit. The armature member 48 is essentially a flat plate which is preferably circular in outer dimension and has a circular inner bore 114. As can be seen in FIG. 1, the armature 48 rests on its supports 68 when the resilient member 46 is seated.

The resilient member 46 is preferably circular and of H-shaped cross-section as shown so as to provide a central cylindrical portion 116 connecting left and right circular flanges 118 and 120, respectively. The flanges 118 and 120 are separated a predetermined amount, which is greater than the thickness of the armature member 48 so as to permit limited relative axial movement therebetween. Furthermore, the flanges 118 and 120 are of predetermined width or thickness so as to permit limited resilient deformation, as illustrated in FIG. 1, with respect to flange 118 when the flat surface portion 50 is seated on the valve seat 52, with the surface 72 of the armature member 48 also being seated on the armature supports 68. Similarly, flange 120 will resiliently deform when the second flat surface portion 54 is mated to the second valve seat 56 and the armature member 48 is at rest on the core flange 112. To establish the above conditions, the relative heights of the armature support projections 68 and valve seat projection 66, as well as the width of the flange 118, are determined such that, when the flat surface portion 50 is in initial contact with the valve seat 52, a slight gap remains between the surface 72 of the armature member 48 and the radiused outward portion 70 of the armature support projections 68. Accordingly, continued movement of the armature member 48 towards the left under the influence of the coiled-spring member 58 causes deformation of the resilient circular flange 118 as illustrated in FIG. 1. Similarly, the relative heights of the valve seat 56 and the core flange 112, as well as the width of the flange 120, are determined to establish a like deformation of the flange 120 when the movable valve assembly 44 is seated to the right. Due to this provision, the valve assembly 44 is forcibly seated regardless of manufacturing variations.

From the foregoing description, it now can be seen that a magnetic circuit has been provided in which a low reluctance flux path is established through the radial web 110, the axial flange 112 and the stem 36 of the core 32, the end plate 92, and the cylindrical body 78 to the inwardly extending flange 82. It can be seen further that when the armature member 48 is in its leftward position, as viewed in FIG. 1, the magnetic circuit is complete through a first annular axial air gap 122, the armature member 48, and a second annular axial air gap 124. In other words, the electromagnet 28 has poles 82 and 112 in the vicinity of the armature member 48 which partially bridges the air gap between the poles 82 and 112. Magnetic flux is applied to this circuit through the core 32 from the flux source or windings 30 of the electromagnet 28.

The armature member 48 in the embodiment shown in FIGS. 1 through 4 is preferably covered, coated or plated with a non-magnetic material 47, as is best shown in FIG. 4. The non-magnetic material maintains a predetermined non-magnetic gap, or "artificial air gap", between the armature member 48 and the poles 82 and 112 when electromagnet 28 is energized and the armature member 48 is drawn into engagement with poles 82 and 112. The non-magnetic gap controls the magnetic flux force between the electromagnet 28 and the armature member 48 and reduces the magnetic flux force to a level less than would result if the magnetic material of armature member 48 were allowed to contact poles 82 and 112 directly. This is because the magnetic flux force is exponentially inverse to the size of non-magnetic gap. Thus by controlling and limiting such magnetic flux force, the force needed to move the armature member away from the poles 82 and 112 may be controlled and reduced, thereby allowing the coiled-spring member 58 to be lighter than if the non-magnetic gap were not present. Such reduced force and lighter coiled-spring member 58 also allows the magnetic valve 10 to operate at a faster speed, with reduced response time.

The non-magnetic material 47 may be composed of any number of known non-magnetic substances, including synthetic materials. However, the preferred non-magnetic material 47 is a composite coating of a first layer of copper, or a copper-containing substance, covered with a second layer of electroless nickel. The finished copper layer is relatively smooth, relatively inexpensive and easy to apply by plating or other known methods. The electroless nickel layer is relatively hard and is provided to increase the wear-resistance of the composite non-magnetic material 47. In order to maintain a functional non-magnetic gap, the non-magnetic material 47 is only required in the annular region of the face of the armature member 48 and engages the poles 82 and 112 when the electromagnet 28 is energized. However, in the preferred arrangement, the entire armature member 48 is covered with the non-magnetic material 47 for purposes of economy and ease of manufacture.

The non-magnetic gap is preferably formed by plating, coating or covering the armature member 48 with a first layer of the preferred copper material. The coated armature member is then tumbled in a tumbling apparatus, such as those known in the art, to polish the first layer. As is shown in FIG. 4, the armature member 48 will have a radius 49 formed thereon.

Specifically in an exemplary construction of the magnetic valve, the armature member is machined on a screw machine and then tumbled to remove any abrupt corners. A flash coat of copper, approximately 0.0002 inch thick, is applied and the armature member is heated to harden the flash coating. A finish coat of copper, approximately 0.002 inch thick, is applied to complete the first layer, and the coating armature member is then tumbled as described above.

The thickness of the first layer in one embodiment is, in practice, approximately three-fourths of the total predetermined non-magnetic gap thicknesses, although one skilled in the art will recognize that such proportion may be varied in accordance with other materials used. The armature member 48 is then plated, covered or coated with a second layer of the preferred electroless nickel and again tumbled to polish the second layer, if deemed necessary. Finally, the armature member 48 is preferably heated to further harden the second layer.

The desired thickness of the non-magnetic gap may be different with different embodiments of the magnetic valve 10 for different applications. Such thickness is, however, readily determinable from the foregoing description by one skilled in the art It should also be noted that the uniformity of such thickness is not critical as will become more apparent later in this description.

In operation, if the magnetic valve 10 is to be used in the normally-closed mode, the fitting 14 is connected to a source of reduced pressure so as to create a pressure differential across the magnetic valve 10. In one of its intended uses, the fitting 14 is connected to the manifold of an automobile engine so that the opening 20 communicates with manifold vacuum. The fitting 18 is connected to a fluid pressure utilization device. For example, the fitting 18 may be connected to an air conditioning system control for an automobile, an ignition advance diaphragm of the distributor, a damper door for a heating and ventilation system, or a vent control for a fuel tank. If the magnetic valve 10 is to be operated in its normally-open mode, the source of fluid at reduced pressure is connected to the fitting 16. In either case, the unused fitting 14 or 16 may be left open so as to vent the utilization device to atmosphere when the valve is closed, or may be capped to prevent such venting. Moreover, the utilization device may be connected to two different sources by connecting each source to one of the fittings 14 and 16. Obviously, a valve according to this invention may be readily constructed which operates only in the normally-open mode or the normally-closed mode simply by providing only a single fitting 14 or 16 for connection to the vacuum or pressure source.

The magnetic valve 10 is operated or activated by delivering electrical power to the terminals 38 and 40 to provide a flow of current through the convolutions of conductor 34 and a consequent generation of magnetic flux force through the circuit described above. As a consequence of the well known effect of the force of magnetic flux through the air gaps 122 and 124, a force on the armature member 48 will be established tending to move the armature member 48 to the right, i.e., toward the poles 82 and 112. Due to purposeful or inherent manufacturing variations, for example, in the height of the armature support projections 68, the air gaps 122 and 124, and consequently the circumferential distribution of the flux field about the armature member 48, will not be uniform. As a result, the force created by the electromagnet 28 will be unevenly applied to the armature member 48 tending to lift one portion thereof prior to lifting of the remaining portions. Accordingly, the initial movement of the armature member 48 will or may be a tilting or angular, rotational movement wherein the armature 48 will pivot about one or two of the armature support projections 68. This effect is regenerative, i.e., initial movement of the armature member 48 toward the poles 82 and 112 reduces the air gaps 122 and 124 thereby causing an exponential increase in flux which correspondingly exponentially increases the force tending to move that portion of the armature member 48 to the right.

As will be appreciated in view of FIG. 1, initial movement of the armature member 48 is opposed only by the coiled-spring member 58 since the circular flanges 118 and 120 are spaced apart more than the thickness of the armature member 48. After a predetermined limited pivotal movement of the armature, the aforementioned armature portion engages the corresponding portion of the radial lip 120 of the resilient member 46. Prior to this engagement of the resilient lip 120, the armature member 48 will obtain an initial angular velocity or impetus which provides an inertia force which is at least partially expended on the resilient member 46 to overcome the seating force caused by the pressure differential across the valve seat. A synergistic effect is achieved since only one radially outwardly portion of the resilient member 46 is being forcibly acted upon such that the initial effect of the armature engagement is to "peel" or "pry" the resilient member 46 from the valve seat 52.

The initial pivotal movement of the armature member 48 and the consequent "prying" or "peeling" action, discussed above, can be more easily seen with reference to FIG. 3, in which a partial cross-sectional view of the magnetic valve 10 is shown in a transient state immediately after activation thereof. Note that the armature 48 is in contact with a radially outward portion of the resilient lip 120 after having undergone an initial angular movement and is consequently applying a concentrated force tending to lift, peel or pry the resilient member 46 from the valve seat 52 at only one portion thereof so as to cause an initial rush of fluid by that valve seat portion. A second regenerative effect is achieved in that the initial rush of fluid rapidly reduces the pressure differential across the valve seat 52, and correspondingly reduces the force necessary to lift the resilient member 46 from the valve seat 52. Accordingly, the momentary high force provided by the inertia of the armature member 48 is applied when a momentary high force is required so as to "crack" the valve and equalize the pressure across the valve. Once the valve is "cracked" a much lower force requirement exists which can be supplied by virtue of the magnetic flux itself.

Consider now the operation of the magnetic valve 10 in the normally-open mode in which the fitting 16 is connected to a source of reduced pressure, for example, to a manifold of an automobile engine. Upon energization of the electromagnet 28, the armature member 48 will be pulled fully to the right, thereby sealingly engaging the second flat surface portion 54 with the second valve seat 56 so as to terminate flow by the second valve seat 56. Upon deenergization of the electromagnet 28, the armature member 48 will move leftward under the influence of the spring 58. However, the flux decay is not uniform with respect to the armature 48, because the thickness of the non-magnetic material 47 is not perfectly uniform as a result of manufacturing tolerances in the above-described preferred tumbling process. Accordingly the armature 48 pivotally engages the circular flange 118 of the resilient member 46 tending to peel or pry the member 46 from the valve seat 56. During this initial movement, an inertia is acquired by the armature member 48 which aids the lifting of the resilient member 46 from the valve seat 56 against the pressure differential established by the vacuum in the opening 22. Accordingly, the limited axial movement between the armature 48 and the resilient member 46 and the pivotal movement of the armature 48 also aids in unseating the resilient member 46 when the magnetic valve 10 operates in the normally-open mode in a manner similar to that described above in connection with the operation of the magnetic valve 10 in the normally-closed mode.

In the illustration of FIG. 3, it can be seen that the resilient member 46 comprises very flexible radial flanges 118 and 120 and a relatively much less flexible central portion 116. Consequently, lifting of the resilient valve member 46 is more in the nature of a "prying" effect rather than a "peeling" effect. More of a "peeling" effect can be obtained by using relatively rigid flanges (or other mounting means for member 46) and a relatively flexible central portion. If desired, any combination of flexibilities may be used to mix these effects so long as the resilient member 46 remains in operative association with the armature member 48. The combined effects of the inertia force provided by the initial movement of the armature member 48 and the pivotal movement applying a substantial force to only one radial outward portion of the resilient member 46 allows satisfactory operation of the magnetic valve 10 with a lesser flux requirement than magnetic valves currently in use. Consequently, the number of ampere-turns in the magnetic source 30 may be reduced at a significant reduction in the cost of a suitable magnetic valve. Moreover, the flat valve configuration, as opposed to a needle valve configuration, requires only small excursion of the movable valve assembly 44 with respect to the valve seat 52 to achieve minimum flow restriction through the valve seats.

A variation on the embodiment of the magnetic valve 10 shown in FIGS. 1 through 4 may be constructed in accordance with the present invention by providing at least the poles 82 and 112 of the electromagnet 28 with the non-magnetic material 47 as is described above for the covering of the armature member 48. Thus the non-magnetic gap may alternatively be provided on the electromagnetic 28 rather than on the armature member 48.

Alternatively, another variation of an exemplary valve within the scope of this invention may also be constructed by utilizing a movable core. Such movable core would be connected to the plate carrying the resilient member 46 such that movement of the core in response to energization of the flux source would lift the resilient member 46 from the valve seat 52. Preferably, the connection between the movable core and the plate, or the association between the plate and the resilient member 46, would be askew, or would be pivotal, so as to give the "prying" action described above. For example, the member 48 may have an angulated flange to achieve the askewed association. Of course, it is preferred to provide limited relative movement between the plate and movable core or the plate and resilient member 46 to establish an initial impetus or inertia prior to lifting the resilient member 46 from the seat 52. In such a variation, the non-magnetic material should be located at least in the portion of the core that is in close proximity with the windings 30.

In one constructed form of the invention, the three projections 68 were replaced by an annular member ridge formed integrally with the end cap 64 and being continuous except for one or more interruptions or openings adjacent, or in communication with, the opening 24 to provide passageways for air flow between opening 24 and the air volume centrally inside of the annular member. In that constructed form, which is similar in principle to that shown in the embodiment of FIGS. 5 and 6, the surface of the annular member facing the armature member 48 was flat and about 0.025 inches wide and the diameter was somewhat larger than that of the circular locus of the projections 68, the outer diameter being about the same as the diameter of armature member 48 so as to preclude any significant movement of any part of the armature 48 in the direction of the end cap 64 (towards the left in FIG. 1) during tilting, an arrangement now preferred. As with projections 68, the annular member preferably projects slightly further (e.g., 0.011 inches) from the inner face of the end cap 64 than the valve seat 52 does.

FIGS. 5 and 6 illustrate an alternate embodiment of the invention, which is now preferred over that of FIGS. 1 through 4. Many of the FIGS. 5 and 6 components and elements, and the functions thereof, are generally similar, with certain exceptions discussed below, to those of the embodiment of FIGS. 1 through 4, and therefore the description thereof will not be repeated. Similar elements with similar functions are indicated by reference numerals in FIGS. 5 and 6 that are 200 members higher than the corresponding reference numerals of FIGS. 1 through 4.

As shown in FIGS. 5 and 6, such alternate embodiment includes a non-magnetic wear plate member 330 disposed and restrained between the pole portion of the electromagnet 228 formed by inwardly extending flange 282 and projection 280 of the end cap assembly 264. Wear plate 330 is restrained from lateral movement by the engagement of its peripheral tabs 332 with the outer surface 334 of the projection 280. The non-magnetic wear plate 330 functions as a non-magnetic gap between the inwardly extending flange 282 and armature member 248 and as a wear barrier, or shim, substantially isolating flange 282 from contact by armature 248 during the above-described tilting, or angular, rotational movement of armature 248, as shown in FIG. 6. The wear plate 330 thus protects flange 282 from damage or wear resulting from contact by armature 248 when the electromagnet is energized.

Wear plate 330 is preferably stamped or otherwise formed from type 316 of stainless steel sheet, quarter hard to half hard, and has a thickness of approximately 0.002 inch to approximately 0.004 inch. In one valve constructed according to this embodiment of the invention, such a wear plate having a thickness of approximately 0.003 inch was employed, and the valve performed satisfactorily during testing in excess of 300,000,000 actuation cycles. Thus use of the wear plate 330 provides for very significant valve life at relatively low expense.

Peripheral tabs 332 are preferably equally spaced about the periphery of wear plate 330 and protrude at an obtuse angle from the flat portion of the wear plate. During assembly, tabs 332 engage O-ring 284 and are deflected inwardly as end cap assembly 264 is press-fitted into a sleeve 338 interlockingly engaged with curved end portion 276 of housing 212. Such deflection allows tabs 332 to be tightly engaged between outer surface 334 and O-ring 284 thereby restraining wear plate 330 from lateral movement and contributing to the sealing compression of O-ring 284.

It should be noted that the axially extending core flange 312 (which forms a pole portion of electromagnet 228) extends inwardly into central chamber 226 slightly beyond inwardly extending flange 282 and wear plate 330. Such a configuration substantially assures that when armature 248 and resilient member 246 move fully away from the first valve seat 252, toward the second valve seat 256, the above-discussed relationship between the inward heights of valve seat 256 and core flange 312 are preserved without interference by wear plate 330. As discussed above, such relative inward heights is important to obtaining the desired deflection of resilient member 246.

In order to maintain the above-discussed advantages of the non-magnetic gap between the poles of the electromagnet and armature 248, wear plate 330 is composed of a non-magnetic material. Preferably, in this embodiment, a coating of non-magnetic material 249 is also provided on armature 248. It has been found, however, that only the above-discussed layer of relatively hard material, electroless nickel, for example, is required in the embodiment of FIGS. 5 and 6 and that the copper-containing layer is not required. The relatively hard layer may be applied to armature 248 in accordance with the procedures set forth above, but eliminating the first layer of copper or copper-containing material. Alternatively, the armature member 248 in this embodiment may be of a stamped fabrication. When stamped, the armature member is heat treated prior to being tumbled, and then a layer of electroless nickel, for example, is applied. Such layer of electroless nickel may have an exemplary thickness of approximately 0.0005 inch.

In view of the above description of exemplary versions of magnetic valve 10 and magnetic valve 210 according to the invention, it will now be appreciated that a magnetic valve is provided which can operate faster, with more rapid response times, and with lower flux levels, and consequently, fewer ampere-turns than with prior art devices. As a result, a substantial cost savings is achieved. Moreover, it can be seen that the lateral alignment between the resilient members 46 and 246 their respective valve seats 52 and 56, and 252 and 256, is not critical, and accordingly, the parts may be manufactured, and the non-magnetic gap and wear plate may be formed, with convenient tolerances. Thus assembly and manufacture of a valve according to the invention may be economically and easily accomplished. Furthermore, any dimensional variations due to wear also are not critical thereby contributing to the reliability and longevity of the device.

While it will be apparent that the teachings herein are well calculated to teach one skilled in the art the method of making the preferred embodiment of this invention, it will be appreciated that the invention is susceptible to modification, variation and change without departing from the proper scope or meaning of the following claims.

I claim:

1. In a magnetic valve having a valve member engageable with a valve seat, a movable armature member connected to said valve member for urging said valve member into and out of said engagement with said valve seat, magnet means for moving said armature member in an axial direction toward said magnet means when said magnet means is energized, the improvement comprising means for imparting a tilting rotational component to at least the initial movement of said armature member and for moving at least a portion of said valve member in a tilting rotational manner relative to said valve seat in response to said tilting rotational movement of said armature member, at least a peripheral portion of said armature member tending to move toward a laterally peripheral portion of said magnet means during said tiliting rotational movement of said armature member, gap means for maintaining a non-magnetic gap between said magnet means and said armature member in order to control the magnetic flux flow and the magnetic flux decay between said magnet means and said armature member when said magnet means is energized and deenergized, respectively, a separate non-magnetic wear plate disposed axially adjacent said peripheral portion of said magnet means and between said peripheral portion of said magnet means and said armature member, said wear plate being impacted by said peripheral porton of said armature member during said tilting rotational movement of said armature member in order to substantially prevent said peripheral portion of said armature member from impacting upon said peripheral portion of said magnet means, said magnet means including a core flange portion disposed laterally inwardly of said peripheral portion, said core flange portion extending beyond said non-magnetic wear plate in an axial direction generally toward said armature member in order to engage said armature member after said tilting rotational movement of said armature member caused by energization of said magnet means.

2. A valve assembly comprising:

a valve member;

a first valve seat and second valve seat in an axially spaced relation from said first valve seat, said valve member being disposed between said first and second valve seats;

a movable armature member connected to said valve member;

biasing means for biasing said armature member and said valve member toward said first valve seat with said valve member in sealing engagement therewith;

magnetic actuating means for forcibly urging said armature and said valve member away from said first valve seat and for forcibly urging said valve member into said sealing engagement with said second valve seat when said magnetic actuating means is energized;

means for imparting a tilting rotational component to at least the initial movement of said armature member away from said first valve seat and for moving at least a portion of said valve member in a tilting rotatonal manner relative to said first valve seat in response to said tilting rotational movement of said armature member, at least a peripheral portion of said armature member tending to move toward a laterally peripheral portion of said magnet means during said tilting rotational movement of said armature member; and a separate wear plate disposed between at least said peripheral portion of said magnetic actuating means and said armature member, said wear plate being impacted by said peripheral portion of said armature member during said tilting rotational movement of said armature member in order to substantially prevent said peripheral portion of said armature member from impacting upon said peripheral portion of said magnetic actuating means during said tilting rotational movement said magnetic actuating means including a core flange portion disposed laterally inwardly of said peripheral portion, said core flange portion extending beyond said non-magnetic wear plate in an axial direction generally toward said armature member in order to engage said armature member after said tilting rotational movement of said armature member.

3. A valve assembly according to claim 2, wherein said wear plate is non-magnetic in order to maintain a non-magnetic gap between said peripheral portion of said magnetic actuating means and said armature member, said non-magnetic gap facilitating said tilting rotational movement of said armature member.

4. The improvement according to claim 1, wherein said magnetic valve includes first and second housing members connected to one another and a deflectable sealing member sealingly compressed between said first and second housing members, said wear plate including a number of peripheral tab members thereon, said tab members and said sealing member engaging one another to substantially prevent movement of said wear plate and to contribute to said sealing compression of said sealing member.

5. The improvement according to claim 1, wherein said gap means is on said armature member and is non-uniform in thickness so that said magnetic flux flow and said magnetic flux decay are correspondingly non-uniform in order to facilitate said tilting rotational movement of said armature member.

6. The improvement according to claim 2, further comprising gap means on said armature member for maintaining a non-magnetic gap between said armature member and said magnetic actuating means, said gap means being non-uniform in thickness so that the magnetic flux flow and the magnetic flux decay between said magnetic actuating means and said armature member are correspondingly non-uniform in order to facilitate said tilting rotational movement of said armature member.

7. The improvement according to claim 2, wherein said valve assembly includes first and second housing members connected to one another and a deflectable sealing member sealingly compressed between said first and second housing members, said wear plate including a number of peripheral tab members thereon, said tab members and said sealing member engaging one another to substantially prevent movement of said wear plate and to contribute to said sealing compression of said sealing member.

8. The improvement according to claim 1, wherein said gap means is on said magnet means and is non-uniform in thickness so that said magnetic flux flow and said magnetic flux decay are correspondingly non-uniform in order to facilitate said tilting rotational movement of said armature member.

* * * * *